US012401144B2

(12) United States Patent
Lo et al.

(10) Patent No.: US 12,401,144 B2
(45) Date of Patent: Aug. 26, 2025

(54) COMBINATION STRUCTURE OF OUTPUT LINE AND TERMINAL

(71) Applicant: DELTA ELECTRONICS, INC., Taoyuan (TW)

(72) Inventors: Wen-Chuan Lo, Taoyuan (TW); Po-Yi Kuo, Taoyuan (TW); Chia-Hsiong Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 250 days.

(21) Appl. No.: 18/137,180

(22) Filed: Apr. 20, 2023

(65) Prior Publication Data

US 2024/0258722 A1 Aug. 1, 2024

(30) Foreign Application Priority Data

Jan. 31, 2023 (CN) ......................... 202310084438.1

(51) Int. Cl.
*H01R 12/53* (2011.01)
*H01R 4/18* (2006.01)
(Continued)

(52) U.S. Cl.
CPC ............. *H01R 12/53* (2013.01); *H01R 4/187* (2013.01); *H01R 4/70* (2013.01); *H01R 12/58* (2013.01)

(58) Field of Classification Search
CPC .......... H01R 4/02; H01R 12/53; H01R 4/185; H01R 4/187; H01R 4/70; H01R 12/55; H01R 12/58; H01R 13/40; H01R 2107/00
(Continued)

(56) References Cited

U.S. PATENT DOCUMENTS

2015/0044889 A1 2/2015 Wang et al.
2022/0400557 A1* 12/2022 Lewis .................... B23K 1/206

FOREIGN PATENT DOCUMENTS

CN 203481423 U 3/2014
CN 111509457 * 8/2020
(Continued)

OTHER PUBLICATIONS

Office Action dated Sep. 11, 2023 of the corresponding Taiwan patent application No. 112103255.
(Continued)

*Primary Examiner* — Timothy J Thompson
*Assistant Examiner* — Michael F McAllister
(74) *Attorney, Agent, or Firm* — Chun-Ming Shih; HDLS IPR SERVICES

(57) ABSTRACT

This disclosure relates to a combination structure of an output line and a terminal. An output line includes an insulation sleeve and a copper wire. A conducting terminal includes a riveting ring, a conducting ring and a soldering segment connected to one another. The riveting ring is fixed on the insulation sleeve. The conducting ring covers the copper wire. The soldering segment is bent and extended with an included angle with respect to an extending direction of the output line. The output line and the conducting terminal pass through a reflow oven to make the conducting ring and the copper wire be tinned and connected. The insulation seat includes a base and a terminal slot. The soldering segment is embedded in the terminal slot. The circuit board and the conducting terminal pass through the reflow oven to make the soldering segment be tinned and connected to the circuit board.

10 Claims, 7 Drawing Sheets

1

(51) Int. Cl.
*H01R 4/70* (2006.01)
*H01R 12/58* (2011.01)

(58) Field of Classification Search
USPC .......................................................... 174/250
See application file for complete search history.

(56) References Cited

FOREIGN PATENT DOCUMENTS

| | | | |
|---|---|---|---|
| CN | 111509457 | A | 8/2020 |
| JP | H06218535 | A | 8/1994 |
| JP | 2000133352 | A | 5/2000 |
| JP | 2006108053 | A | 4/2006 |

OTHER PUBLICATIONS

Search Report dated Sep. 11, 2023 of the corresponding PCT patent application No. PCT/CN2023/099436.

* cited by examiner

COMBINATION STRUCTURE OF OUTPUT LINE AND TERMINAL

BACKGROUND OF THE DISCLOSURE

Technical Field

This disclosure relates to a combination structure of a terminal, and more particularly relates to a combination structure of an output line and a terminal.

Description of Related Art

Electronic products transmit the power or signals through output lines and terminals to achieve the connection function. Moreover, in the related art, multiple output lines with the same voltage and the same colors are combined and riveted with the terminal, and the terminal is inserted in the socket to be a wire-to-board connector. Then, the wire-to-board connector is plugged vertically on the circuit board to achieve the purpose of connection.

After the socket is combined with the output lines and the terminal, multiple output lines may protrude from the socket in an arched shape and have a certain height. When this wire-to-board connector is applied to thin-type products, multiple arched output lines may protrude from the socket. When a force is exerted to the output lines during the assembly process, the output line may generate an internal stress to cause the circuit board cracking and affect the electrical connection.

In view of the above drawbacks, the inventor proposes this disclosure based on his expert knowledge and elaborate researches in order to solve the problems of related art.

SUMMARY OF THE DISCLOSURE

One object of this disclosure is to provide a combination structure of an output line and a conducting terminal, which is applied to thin-type products to ensure the quality of electrical connection.

This disclosure is a combination structure used for passing through a reflow oven and bonded to a circuit board. The combination structure includes an output line, a conducting terminal, and an insulation seat. The output line includes an insulation sleeve and a copper wire protruding from the insulation sleeve. The conducting terminal includes a riveting ring, a conducting ring and a soldering segment connected to one another. The riveting ring is fixed outside the insulation sleeve. The conducting ring covers the copper wire. The soldering segment is bent and extended with an included angle with respect to an extending direction of the output line. The output line and the conducting terminal pass through the reflow oven to make the conducting ring and the copper wire be tinned and connected with each other. The insulation seat includes a base and at least one terminal slot disposed in the base. The soldering segment is embedded in the at least one terminal slot and inserted to the circuit board. The circuit board and the conducting terminal pass through the reflow oven to make the soldering segment be tinned and connected to the circuit board.

In comparison with the related art, the conducting terminal of this disclosure includes a riveting ring, a conducting ring and a soldering segment connected to one another. The riveting ring is fixed outside the insulation sleeve, and the conducting ring covers the copper wire of the output line. Additionally, the soldering segment is bent in a direction perpendicular to the extending direction of the output line.

Furthermore, the conducting ring and the copper wire are tinned and connected after the output line and the conducting terminal passing through the reflow oven. Therefore, the output line may be extended in a direction parallel to the circuit board without arching after combining with the insulation seat, and applicable to thin-type products. Therefore, the output line may not be squeezed, and the quality of electrical connection is ensured and the convenience of use is increased.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
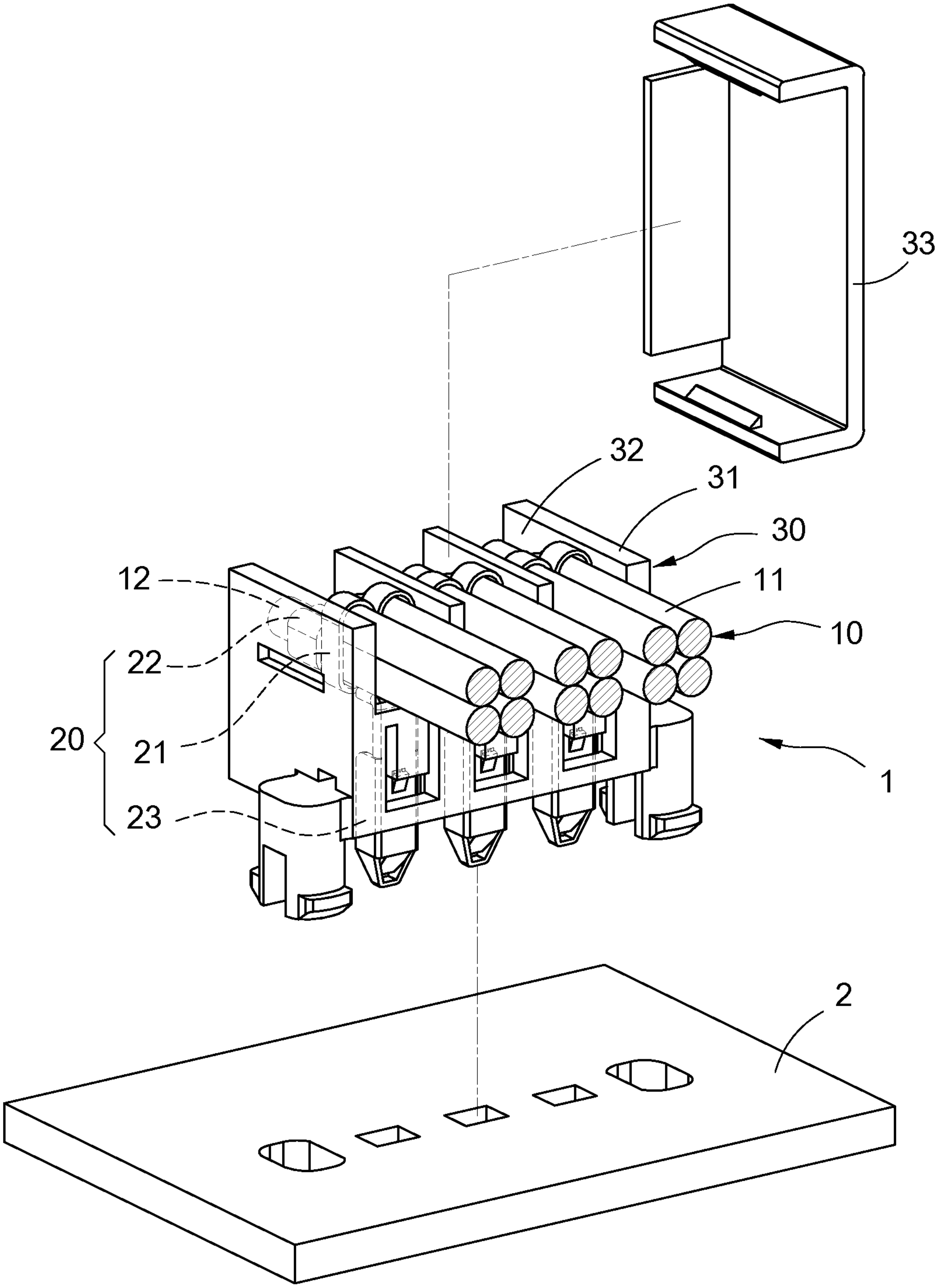
FIG. 1 is a schematic view of the insulation seat in combination with the circuit board in this disclosure.
Figure 2:
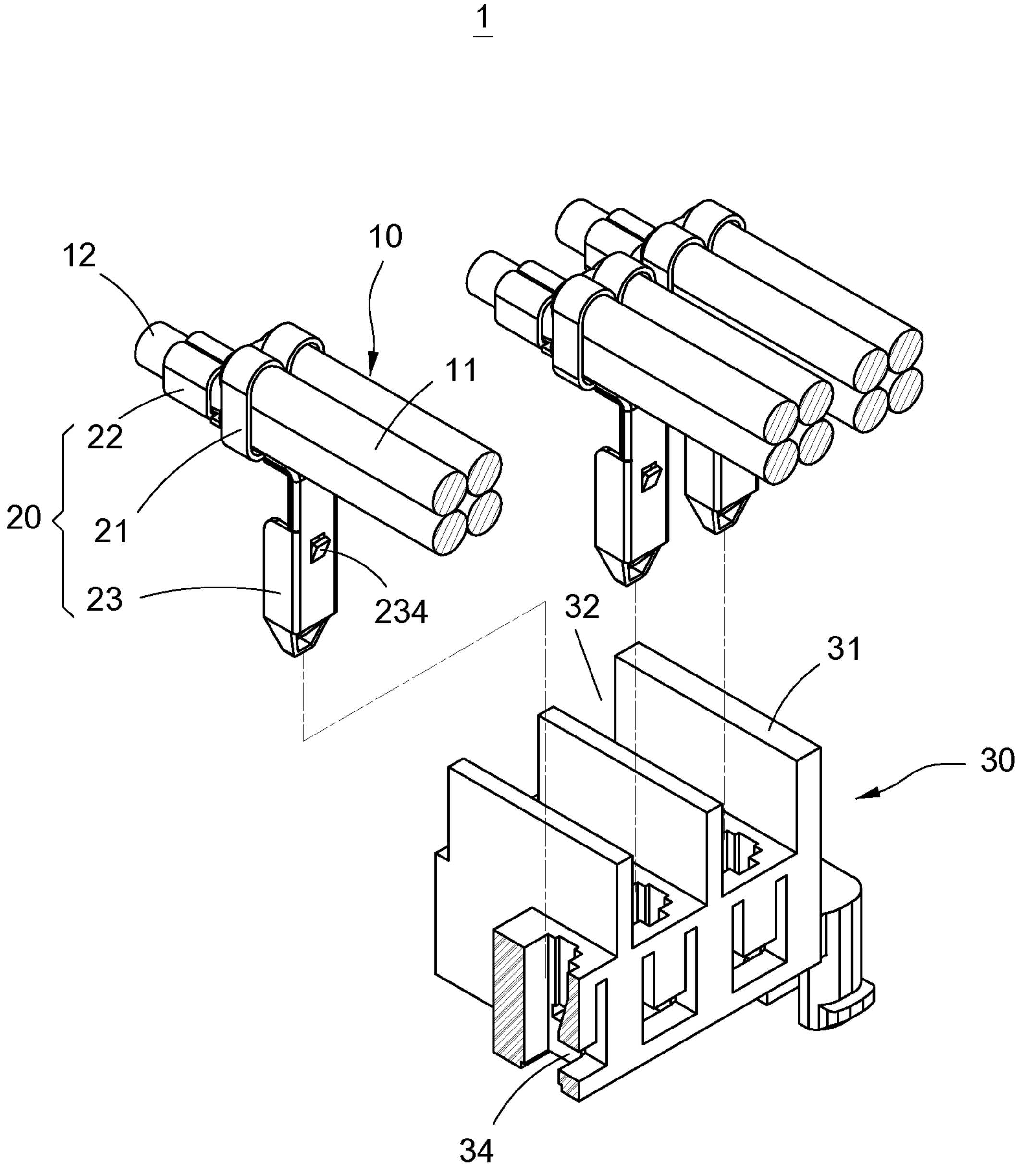
FIG. 2 is an exploded perspective schematic view of the conducting terminal and the insulation seat in this disclosure.

Please refer to FIG. 1 and FIG. 2, which are a schematic view of the insulation seat in combination with the circuit board in this disclosure and an exploded perspective schematic view of the conducting terminal and the insulation seat in this disclosure. This disclosure is a combination structure 1 of an output line 10 and a conducting terminal 20 used for passing through a reflow oven (not shown in figures) and bonded to a circuit board 2. The combination structure 1 includes at least one output line 10, a conducting terminal 20 and an insulation seat 30. The output line 10 is combined with the conducting terminal 20 and inserted in the insulation seat 30. Further, the insulation seat 30 is combined with the circuit board 2. The output line 10 is electrically connected to the circuit board 2 through the conducting terminal 20. More detail of the combination structure 1 of the output line 10 and the conducting terminal 20 is as follows.

The output line 10 includes an insulation sleeve 11 and a copper wire 12 protruding from the insulation sleeve 11.

The conducting terminal 20 includes a riveting ring 21, a conducting ring 22 and a soldering segment 23 connected to one another. The riveting ring 21 is fixed outside the insulation sleeve 11. The conducting ring covers the copper wire 12 protruding from the insulation sleeve 11. Additionally, the soldering segment 23 is bent and extended with an included angle with respect to an extending direction of the output line 10.

It is worth noticing that a part of the conducting ring 22 and the copper wire 12 are tinned and connected with each other after the output line 10 and the conducting terminal 20 passing through the reflow oven. In this embodiment, the included angle is 90 degrees, but not limited thereto.

In one embodiment of this disclosure, the number of output line 10 is multiple. The riveting ring 21 is fixed and embedded outside the insulation sleeves 11 of multiple output lines 10. Specifically, the riveting ring 21 is fixed on the insulation sleeves 11 of the multiple output lines 10. Furthermore, the copper wires 12 of the output lines 10 are combined together to form a single copper wire 12 covered (or clasped) by the conducting ring 22.

Moreover, the insulation seat 30 includes a base 31 and at least one terminal slot 32 disposed in the base 31. Additionally, the soldering segment 23 of the conducting terminal 20 is embedded in the terminal slot 32 for facilitating the insertion to the circuit board 2. Furthermore, the soldering segment 23 is tinned and connected to the circuit board 2 after the circuit board 2 and the conducting terminal 20 passing through the reflow oven. Therefore, the output line 10 is fixed on the circuit board 2 through the insulation seat 30, and is electrically connected to the circuit board 2 through the conducting terminal 20.

In one embodiment of this disclosure, the insulation seat 30 further includes an insulation lid 33. The insulation lid 33 covers the base 31.

Figure 3:
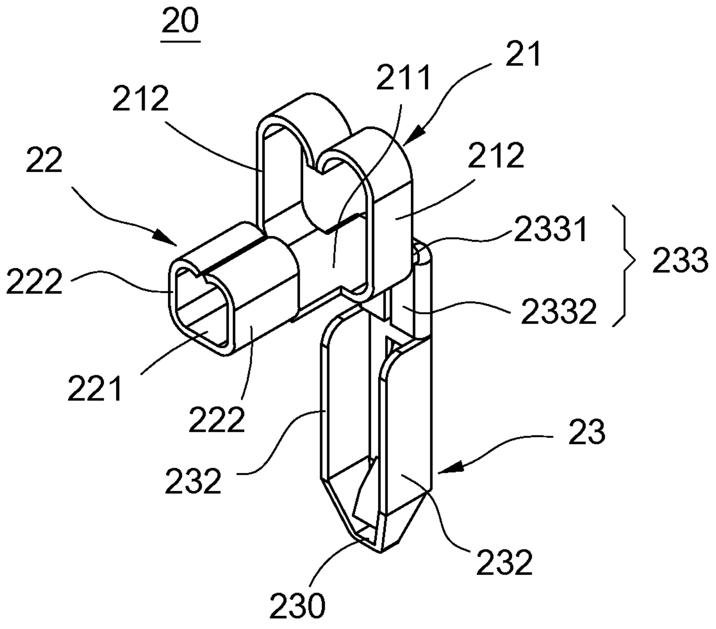
FIG. 3 and FIG. 4 are perspective schematic views of two sides of the conducting terminal in this disclosure.
Figure 4:
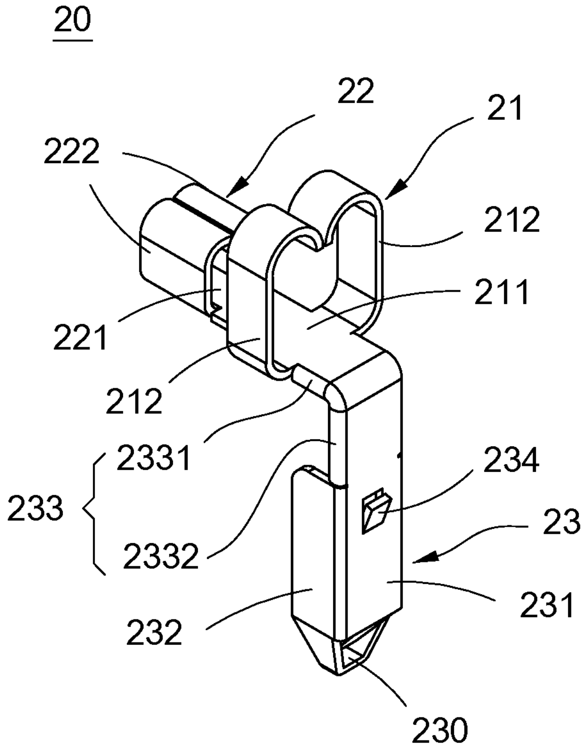
Figure 5:
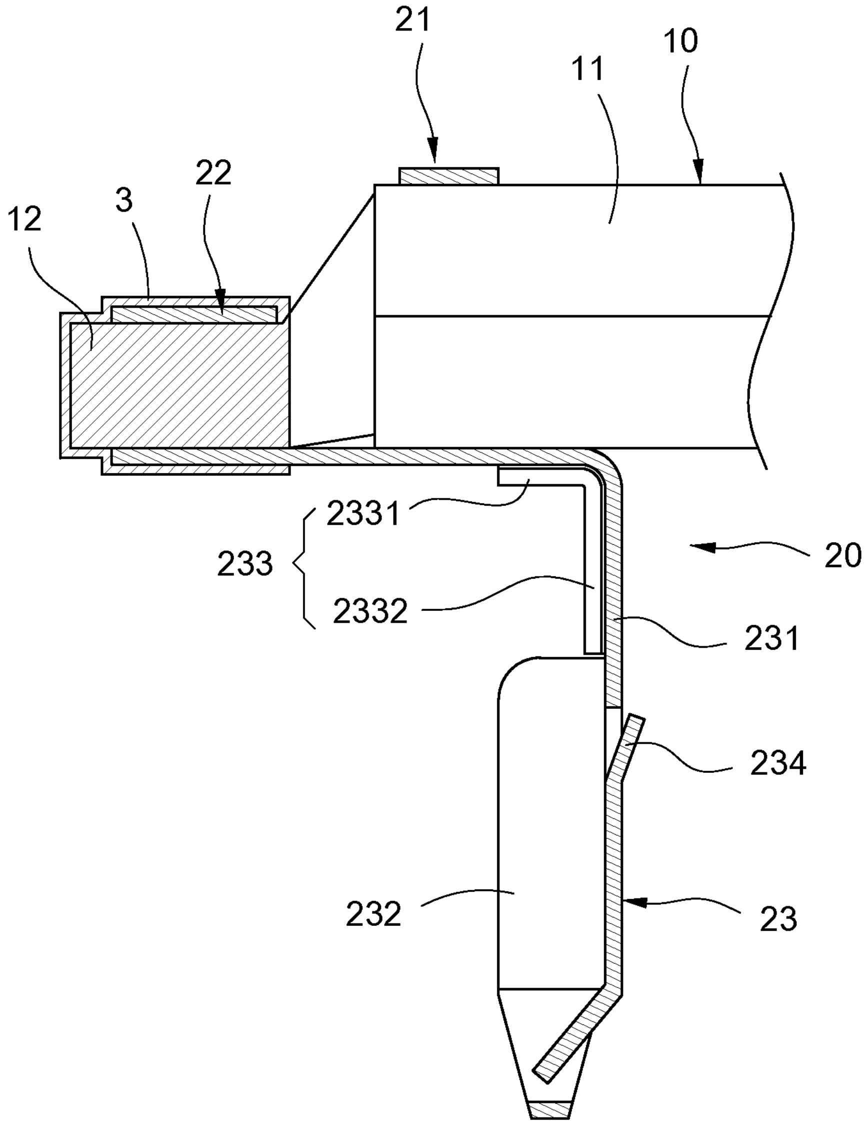
FIG. 5 is a schematic view of the conducting terminal in combination with the output line in this disclosure.

Please further refer to FIG. 3 to FIG. 5, which are perspective schematic views of two sides of the conducting terminal in this disclosure, and a schematic view of the conducting terminal in combination with the output line in this disclosure. In this embodiment, the conducting terminal 20 includes a riveting ring 21, a conducting ring 22 and a soldering segment 23 which are integrally formed (or formed in one piece) and connected to one another.

Specifically, the riveting ring 21 includes an inner carrying section 211 and a pair of inner arms 212 bent and extended from the inner carrying section 211. The insulation sleeve 11 is placed on the inner carrying section 211. The pair of inner arms 212 are hooked on two sides of the insulation sleeve opposite to each other.

The conducting ring 22 includes an outer carrying section 221 and a pair of outer arms 222 bent and extended from the outer carrying section 221. The copper wire 12 is placed on the outer carrying section 221. The pair of outer arms 222 cover (or clasp) the outer periphery of the copper wire 12.

The soldering segment 23 includes a plug piece 231 and a pair of positioning plates 232 bent and extended from two sides of the plug piece 231. The pair of positioning plates 232 are extended from the middle position of the plug piece 231 and connected with each other to define a tin slot 230.

Furthermore, the soldering segment 23 further includes a pair of support pieces 233 folded from two sides of the plug piece 231. The pair of support pieces 233 are located between the pair of positioning plates 232 and the output line 10. Additionally, each of the pair of support pieces 233 includes a horizontal reinforcement portion 2331 and a vertical reinforcement portion 2332. The horizontal reinforcement portion 2331 is connected to the riveting ring 21 and extended in a direction away from the conducting ring 22. The vertical reinforcement portion 2332 is connected to the horizontal reinforcement portion 2331 and the pair of positioning plates 232.

It is worth noticing that the soldering segment 23 includes a hook 234 arranged on the plug piece 231 and/or the pair of positioning plates 232. The hook 234 is disposed for positioning the soldering segment 23 in the insulation seat 30. Additionally, the solder 3 may penetrate in-between the copper wires 12 to increase the connection between each other.

Figure 6:
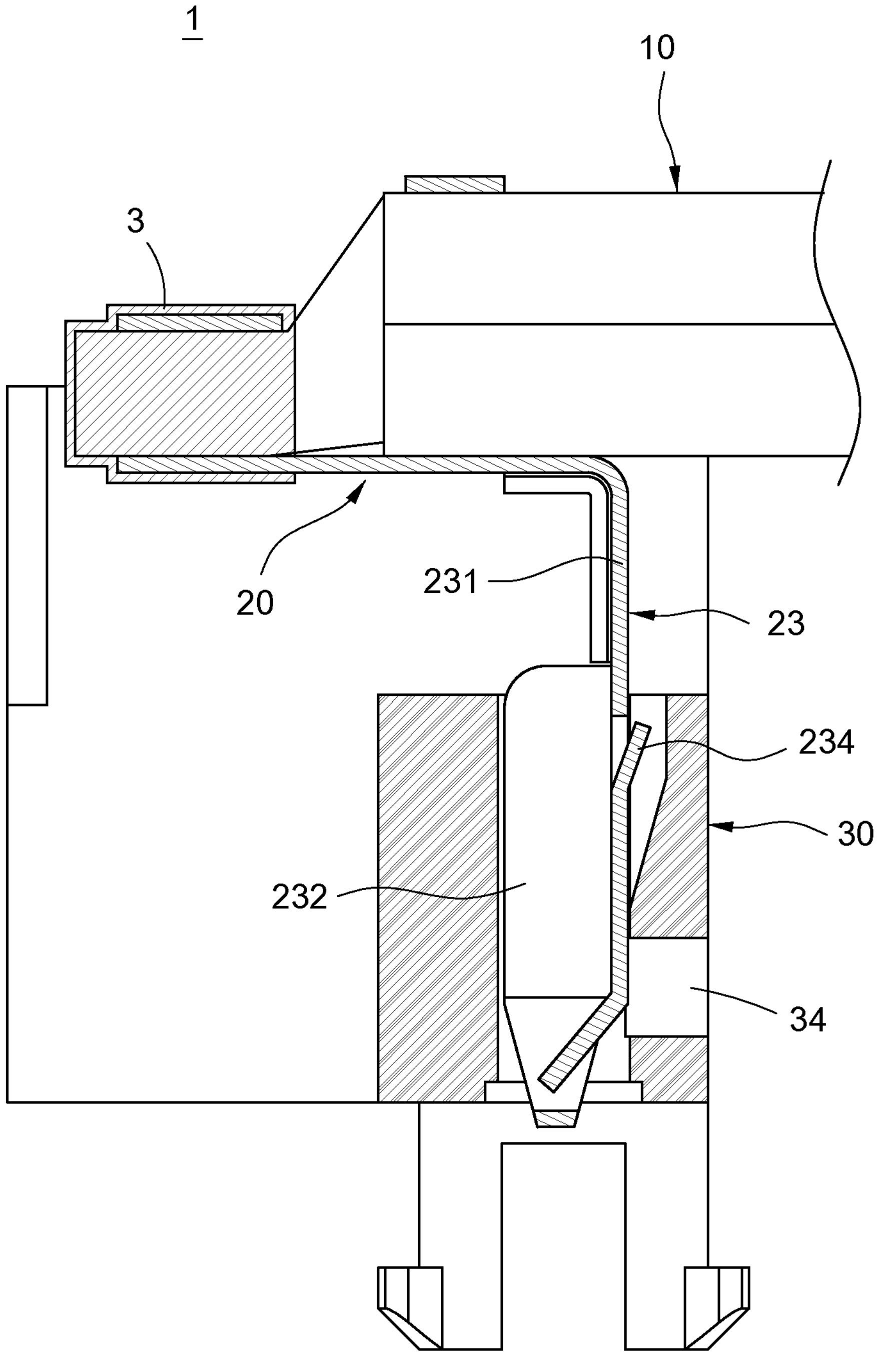
FIG. 6 is a schematic view of the conducting terminal in combination with the insulation seat in this disclosure.
Figure 7:
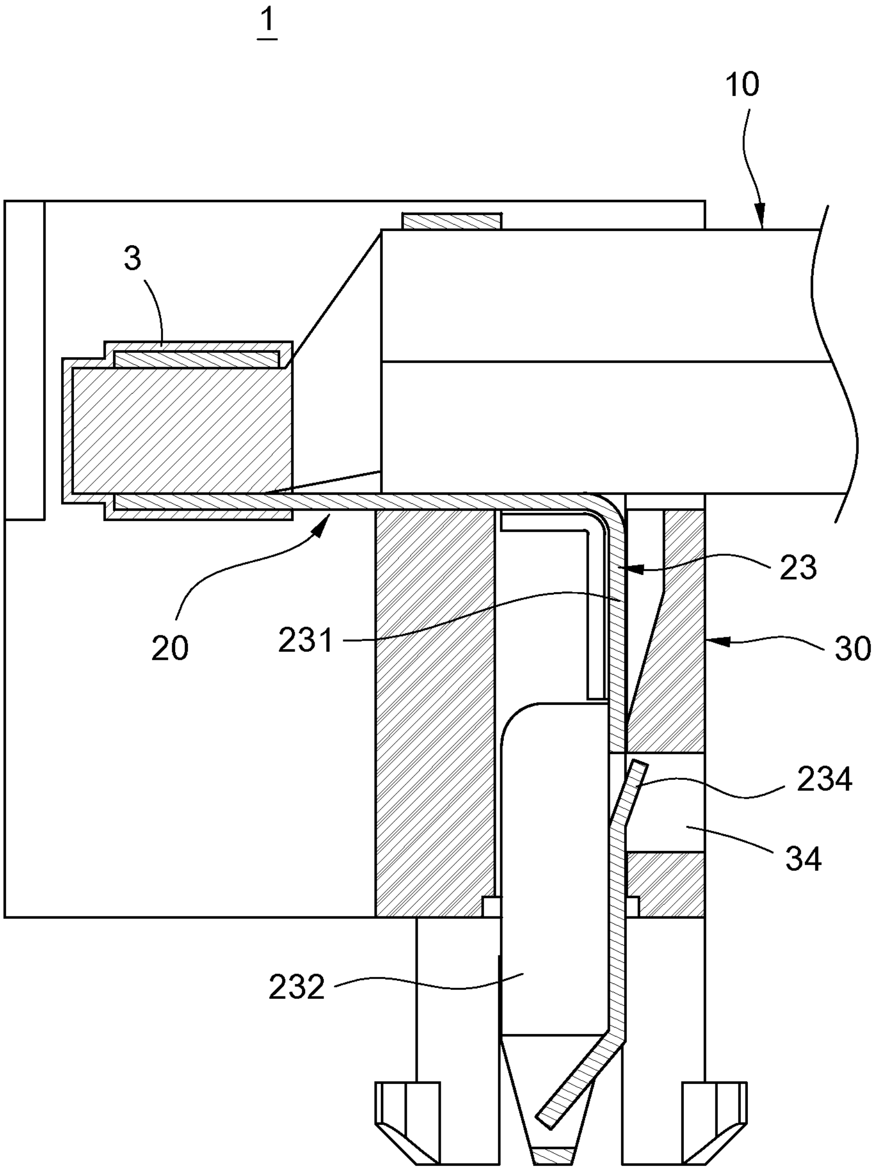
FIG. 7 is a cross sectional view of the conducting terminal in combination with the insulation seat in this disclosure.

Please also refer to FIG. 6 and FIG. 7, which are a schematic view and a cross sectional view of the conducting terminal in combination with the insulation seat in this disclosure. The output line 10 is combined with the conducting terminal 20 and inserted in the insulation seat 30. In this embodiment, the soldering segment 23 includes a hook 234 (referring to FIG. 4) located on the inserting piece 231. Additionally, a notch 34 is disposed on the terminal slot 32 of the insulation seat 30. The soldering segment 23 is positioned in the insulation seat 30 through the hook 234 being engaged with the notch 34.

Figure 8:
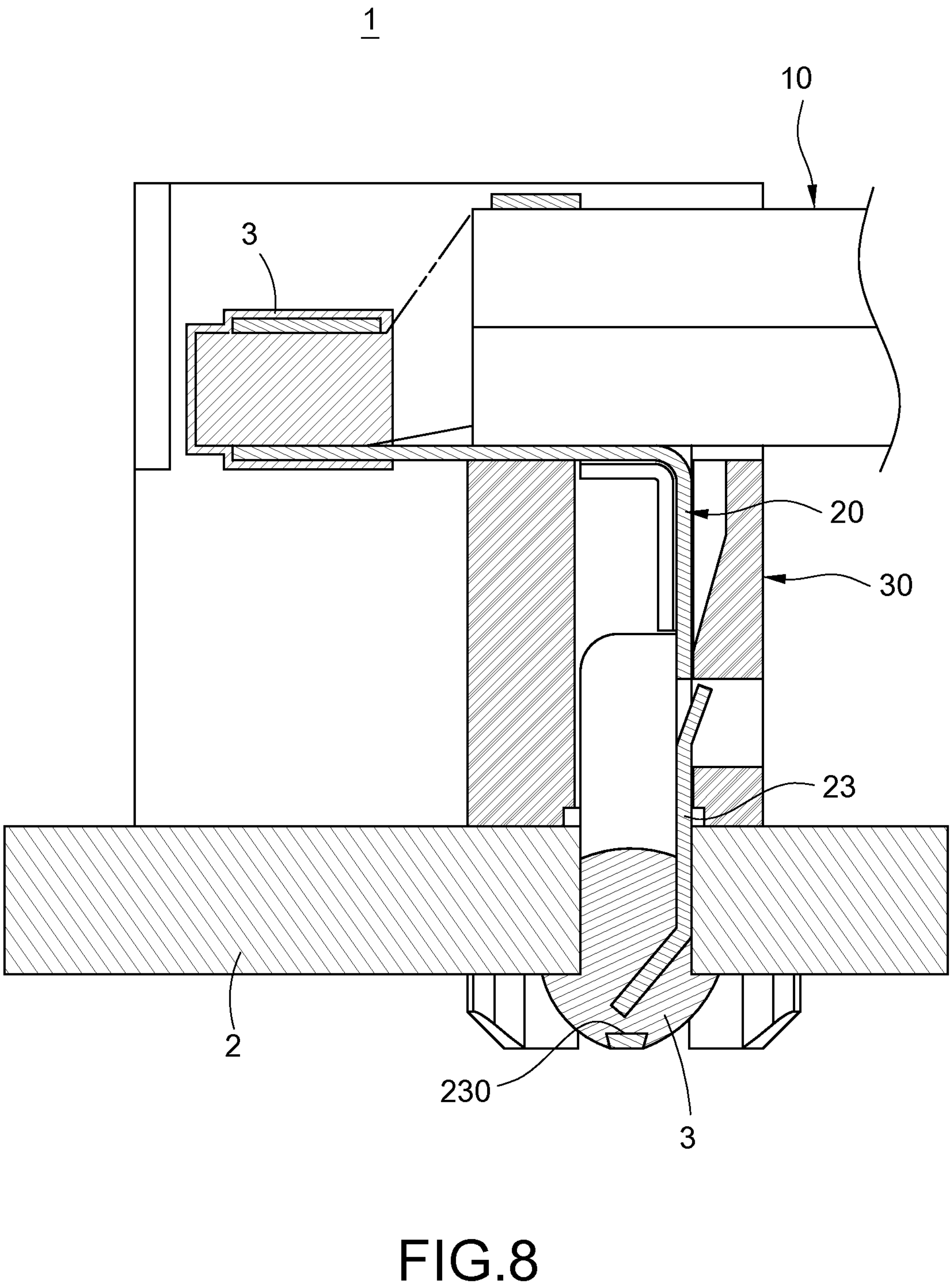
FIG. 8 is a cross sectional view of the conducting terminal in combination with the circuit board in this disclosure.

Please further refer to FIG. 8, which is a cross sectional view of the combination of the conducting terminal and the circuit board in this disclosure. After the output line 10 is connected with the conducting terminal 20 and combined to the insulating seat 30, the insulating seat 30 is inserted to the circuit board 2 for connection. In some embodiments, the bottom side of the circuit board 2 passes through a reflow oven for a wave soldering process. After the wave soldering process, the soldering segment 23 is dipped with tin and is connected to the circuit board 2. Accordingly, the output line 10 is electrically connected to the circuit board 2 through the conducting terminal 20.

It should be noted that the tin slot 230 located on the end of the soldering segment 23 may be attached with more solder 3, so as to increase the bonding force and the conduction between the soldering segment 23 and the circuit board 2.

While this disclosure has been described by means of specific embodiments, numerous modifications and variations could be made thereto by those skilled in the art without departing from the scope and spirit of this disclosure set forth in the claims.

What is claimed is:

1. A combination structure, passing through a reflow oven and bonded to a circuit board, the combination structure comprising:

a plurality of output lines, each output line comprising an insulation sleeve and a copper wire protruding from the insulation sleeve;

a conducting terminal, comprising a riveting ring, a conducting ring and a soldering segment connected to one another, the riveting ring fixed outside the insulation sleeve, the conducting ring covering the copper wire, the soldering segment bent and extended with an included angle with respect to an extending direction of the at least one output line, wherein the at least one output line and the conducting terminal pass through the reflow oven to make the conducting ring and the copper wire be tinned and connected with each other; and an insulation seat, comprising a base and at least one terminal slot disposed in the base, the soldering segment embedded in the at least one terminal slot and inserted in the circuit board, wherein the circuit board and the conducting terminal pass through the reflow oven to make the soldering segment be tinned and connected to the circuit board;

wherein, the riveting ring is fixed and embedded outside the insulation sleeves of the output lines, and copper wires of the output lines are combined together to form a single copper wire and covered by the conducting ring.

2. The combination structure according to claim 1, wherein the included angle is 90 degrees.

3. The combination structure according to claim 1, wherein the riveting ring comprises an inner carrying section and a pair of inner arms bent and extended from the inner carrying section, the insulation sleeve is placed on the inner carrying section, and the pair of inner arms are hooked on two sides of the insulation sleeve opposite to each other.

4. The combination structure according to claim 1, wherein the conducting ring comprises an outer carrying section and a pair of outer arms bent and extended from the outer carrying section, the copper wire is placed on the outer carrying section, and the pair of outer arms cover an outer periphery of the copper wire.

5. The combination structure according to claim 1, wherein the soldering segment comprises a plug piece and a pair of positioning plates bent and extended from two sides of the plug piece, and the pair of positioning plates are extended from a middle position of the plug piece and connected with each other to define a tin slot.

6. The combination structure according to claim 5, wherein the soldering segment comprises a pair of support pieces folded from two sides of the plug piece, and the pair of support pieces are located between the pair of positioning plates and the at least one output line.

7. The combination structure according to claim 6, wherein each of the pair of support pieces comprise a horizontal reinforcement portion and a vertical reinforcement portion, and the horizontal reinforcement portion is connected to the riveting ring and extended in a direction away from the conducting ring, and the vertical reinforcement portion is connected to the horizontal reinforcement portion and the pair of positioning plates.

8. The combination structure according to claim 5, wherein the soldering segment comprises a hook arranged on the plug piece.

9. The combination structure according to claim 8, wherein a notch is disposed on the at least one terminal slot of the insulation seat, and the soldering segment is positioned in the insulation seat through the hook being engaged with the notch.

10. The combination structure according to claim 1, wherein the insulation seat further comprises an insulation lid, and the insulation lid covers the base.

* * * * *